United States Patent [19]
Liang

[11] Patent Number: 6,108,222
[45] Date of Patent: Aug. 22, 2000

[54] POWER FACTOR CORRECTION CIRCUIT

[75] Inventor: Jim H. Liang, Taipei, Taiwan

[73] Assignee: Skynet Electronics Co., Ltd., Taipei, Taiwan

[21] Appl. No.: 09/327,494

[22] Filed: Jun. 8, 1999

[30]     Foreign Application Priority Data

Jan. 4, 1999 [TW] Taiwan ................................. 88105190

[51] Int. Cl.$^7$ .................................................. H02M 1/12
[52] U.S. Cl. ................. 363/48; 363/89; 363/126
[58] Field of Search .................................... 323/205, 222; 363/16, 21, 97, 48, 89, 126, 44, 47

[56]         References Cited

U.S. PATENT DOCUMENTS

| | | | |
|---|---|---|---|
| 5,757,626 | 5/1998 | Jovanovic' et al. ........................ | 363/21 |
| 5,909,107 | 6/1999 | Aonuma ................. | 323/222 |

*Primary Examiner*—Peter S. Wong
*Assistant Examiner*—Gary L. Laxton
*Attorney, Agent, or Firm*—Bacon & Thomas, PLLC

[57]            ABSTRACT

A power factor correction circuit includes a series connection of a bridge rectifier, a first winding, a diode, and an electrolytic capacitor, a series connection of the electrolytic capacitor, a second winding, and a DC/DC converter, and a common core wound round by the first winding and the second winding. The diode is able to switch between a reverse bias and a forward bias by controlling the polarities of the windings such that an input current always flows to the electrolytic capacitor during each sinusoidal period of an ac voltage. Further, a dc ripple voltage of the electrolytic capacitor will not rise, and an output of the DC/DC converter will not be adversely affected by the 120 Hz ac voltage input. By utilizing this circuit, the power factor of a conventional switching power supply is significantly improved.

4 Claims, 16 Drawing Sheets

POWER FACTOR CORRECTION CIRCUIT

BACKGROUND OF THE INVENTION

1. Field of the Invention

The present invention relates to a power factor correction circuit for improving a power factor of an off-line switching power supply in order to comply with the requirements of Class A or Class D stipulated in harmonic current rules IEC-1000-3-2.

2. Description of Related Art

A typical off-line switching power supply is shown in FIG. 1. The supply comprises an AC/DC rectifier 1, and a DC/DC converter 2 in which an electrolytic capacitor $C_1$ is connected as a filter for the bridge rectifier $DB_1$. As such, the electrolytic capacitor $C_1$ begins to charge only when the bridge rectifier $DB_1$ is conducting if the input ac voltage $V_{s1}$ is higher than the voltage of the electrolytic capacitor $C_1$. Note that the input current $1_{pc}$ is a pulsating current as shown in the graph of FIG. 2. The power factor of the input current of the conventional off-line switching power supply is significantly decreased (e.g., approximately 50%), and the total harmonics distortion (hereinafter referred as "THD") is even higher than 100% after the rectification performed by the AC/DC rectifier 1. As a result, the total harmonics is seriously distorted, the quality is poor, and, even worse, the precious energy is wasted.

Thus, many countries have promulgated a number of harmonic current rules (e.g., IEC-1000-3-2) which specify the current waveshape of the power supply for manufacturers to obey in order to improve the efficiency and quality of the power source being supplied.

As such, various designs of power factor correction circuits have been proposed by researchers in order to improve power factor of the conventional off-line switching power supply. These designs have been located in a search as follows;

1. Inductor Type Power Factor Correction Circuit:

As shown in FIG. 3, the prior art discloses a design in which a low frequency large winding $L_1$ is in series between a bridge rectifier $DB_1$ and a electrolytic capacitor $C_1$ The winding $L_1$ and the capacitor $C_1$ form a low pass filter to rectify the input current of a DC/DC converter 2. Such design is similar to the ballast for correcting the power factor of a fluorescent lamp in functionality. However, the winding $L_1$ has the drawbacks of being relatively large, having only a limited power factor improvement, and abnormal high temperature developed.

2. Active Type Power Factor Correction Circuit:

As shown in FIG. 4, the prior art discloses a design in which the AC/DC rectifier is redesigned to form a two-stage circuit with the DC/DC converter 2. Further, a complex control circuit 11 and a large switch element $Q_1$ are added therein to improve the power factor. However, it is relatively complex in circuit design and will cause high manufacturing cost.

3. Dither Type Power Factor Correction Circuit of Single-stage Single-switch:

The prior art shown in FIG. 5 is simple in circuit design. However, the whole circuit is redesigned, and a number of deficiencies have been found in use as follows:

a) The ripple voltage $V_{dc}$ will rise to approximately 100% to 200% if the load suddenly drops significantly when the DC/DC converter 2 is operating in a continuous current mode. As such, a high-voltage electrolytic capacitor is required.

b) The alternating current component of the ac source $V_{s1}$ will be brought into the DC/DC converter 2 when the switch element $Q_1$ conducts. As a result, the output of the DC/DC converter 2 will be adversely affected by the 120 Hz ac voltage input, resulting in the rise of the ripple voltage.

c) The large winding $L_1$ hardly improves the power factor when the DC/DC converter 2 is operating in the continuous current mode.

4. U.S. Pat. No. 5,301,095 to S. Teramoto is disclosed in FIG. 6. Teramoto's patent replaces the diode $D_2$ of the dither type circuit shown in FIG. 5 with a small capacity capacitor $C_3$ in order to improve the power factor. However, the deficiencies of b) and c) as stated above are not effectively eliminated.

5. U.S. Pat. No. 5,600,546 to Fu-Sheng Tsai is disclosed in FIG. 7. Tsai's patent adds another winding $L_3$, which is in series with the diode $D_2$, into the dither type circuit shown in FIG. 5. Such design will resolve the problem of the rise of ripple voltage $V_{dc}$ of the electrolytic capacitor $C_1$, when the DC/DC converter 2 is operating in continuous current mode, by lowering the induction ratio Lp/L1 of the primary winding $L_p$ of the DC/DC converter 2 to the winding $L_1$, or increasing the induction ratio $L_3/L_p$ of the winding $L_3$ to the winding $L_p$. However, the deficiencies of a) and c) as stated above are not effectively eliminated.

Thus, it is desirable to provide a power factor correction circuit in order to overcome the above drawbacks of prior art.

SUMMARY OF THE INVENTION

It is an object of the present invention to provide a power factor correction circuit comprising a series connection of a bridge rectifier, a first winding, a diode, and an electrolytic capacitor; a series connection of the electrolytic capacitor, a second winding, and a DC/DC converter; and a common core wound round by the first winding and the second winding. The diode is able to switch between a reverse bias and a forward bias by controlling the polarities of the windings such that an input current always flows to the electrolytic capacitor during each sinusoidal period of an ac voltage. Further, the power factor of the off-line switching power supply is increased to above 0.9 by appropriately adjusting the induction ratio of the first winding to the second winding in order to comply with the requirements of Class A or Class D stipulated in harmonic current rules IEC-1000-3-2. Furthermore, the ripple voltage of the electrolytic capacitor will not rise if the load suddenly drops significantly when the DC/DC converter is operating in a continuous current mode. As such, the output of the DC/DC converter will not be adversely affected by the 120 Hz ac voltage input.

The above and other objects, features and advantages of the present invention will become apparent from the following detailed description taken with the accompanying drawings.

Figure 9:
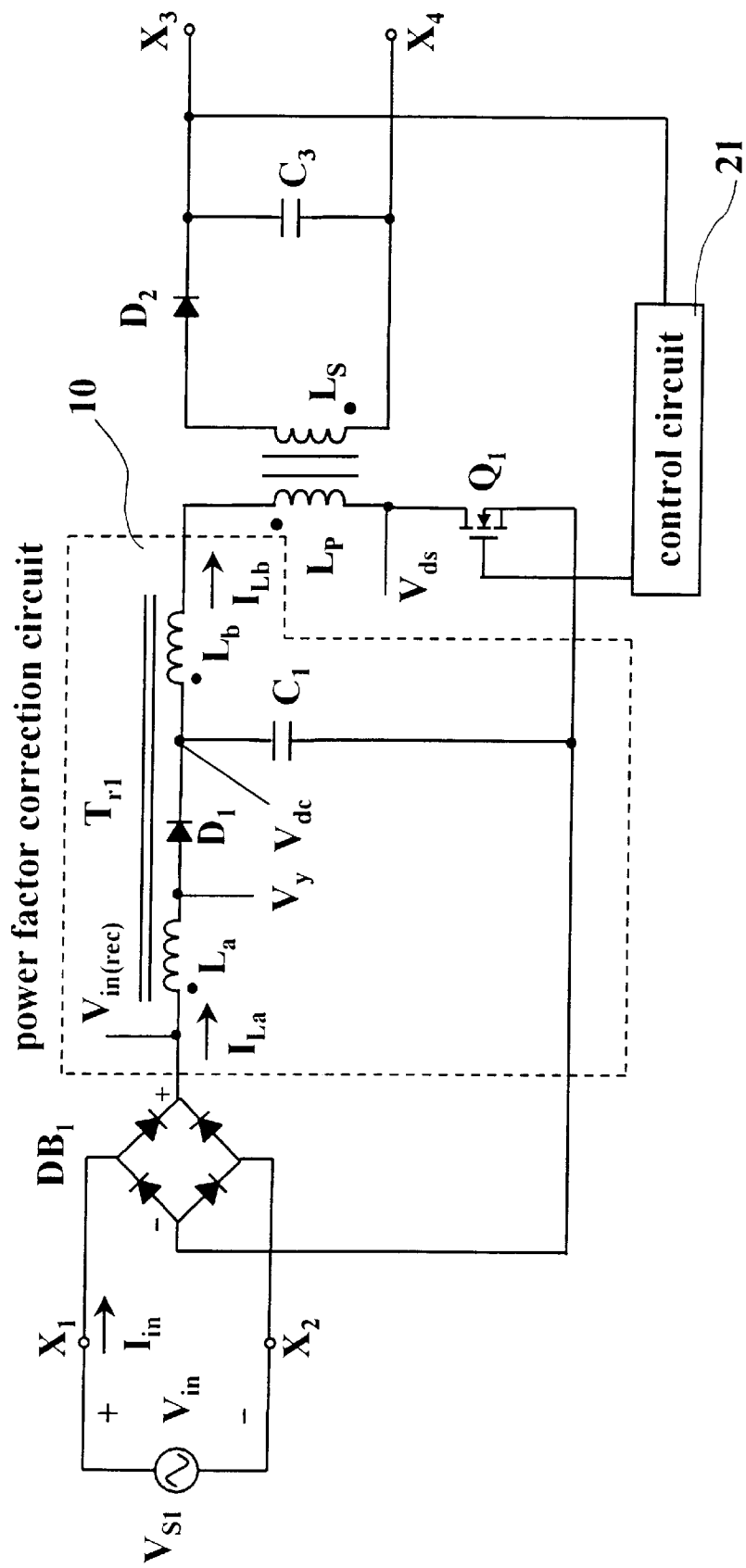
FIG. 9 is a modified circuit diagram of FIG. 8 in which the DC/DC converter is a fly-back converter.

TABLE 1 is the experiment data of the harmonics of the input current $I_{in}$ of the embodiment shown in FIG. 9 comparing with the requirements of Class A stipulated in harmonic current rules IEC-1000-3-2; and TABLE 1 is the experiment data of the harmonics of the input current $I_{in}$ of the embodiment shown in FIG. 9 comparing with the requirements of Class D stipulated in harmonic current rules IEC-1000-3-2.

DETAILED DESCRIPTION OF THE INVENTION

Figure 8:
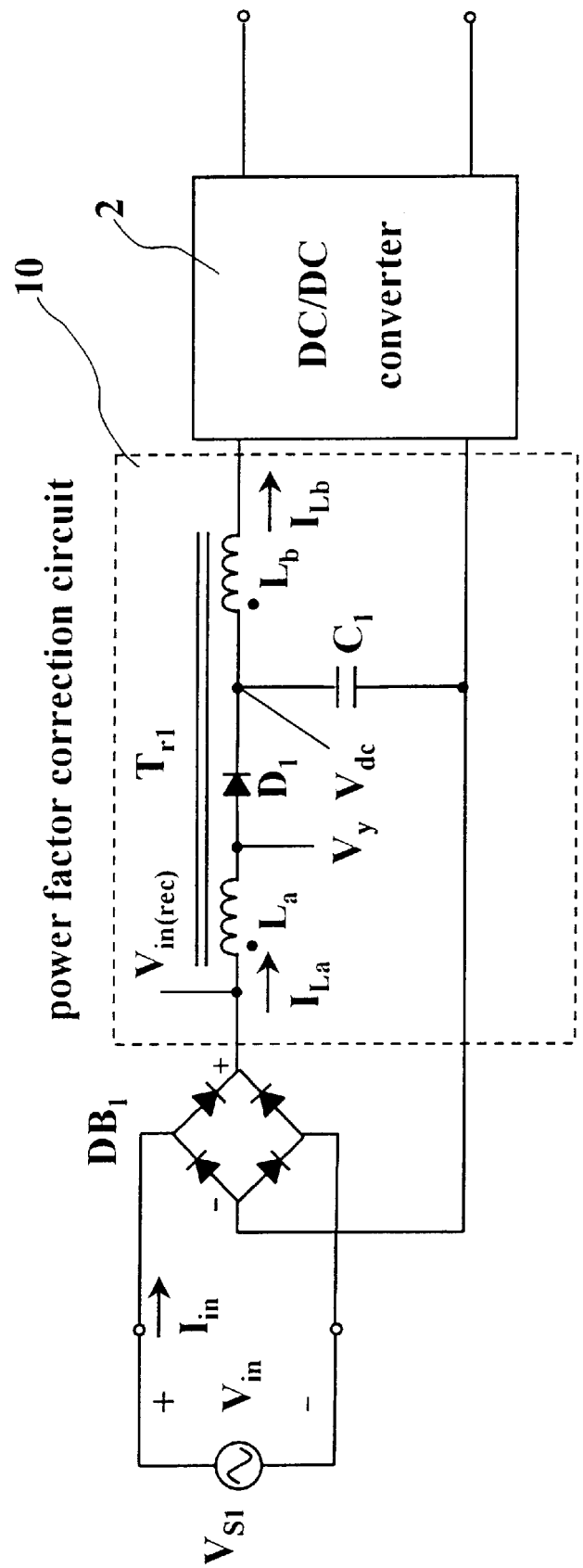
FIG. 8 is a circuit diagram of a preferred embodiment of the present invention.

Referring to FIG. 8, there is shown a preferred embodiment of a power factor correction circuit 10 constructed in accordance with the present invention. The power factor correction circuit 10 comprises a series connection of a bridge rectifier $DB_1$, a first winding $L_a$, a diode $D_1$, and an electrolytic capacitor $C_1$; a series connection of the electrolytic capacitor $C_1$, a second winding $L_b$, and a DC/DC converter 2; and a common core $T_{r1}$ wound round by the first winding $L_a$ and the second winding $L_b$.

In FIG. 9, the DC/DC converter 2 can be a fly-back converter comprising a transformer $T_{r2}$, a switch element $Q_1$, a control circuit 21, a diode $D_2$ on a secondary side of the transformer $T_{r2}$, and a capacitor $C_3$ on the secondary side of the transformer $T_{r2}$. The diode $D_2$ and the capacitor $C_3$ form an output filter. As to the transformer $T_{r2}$, the ratio of the primary winding $L_p$, to the secondary winding $L_s$ with respect to the number of turns is $N_p/Ns$. A series connection consists of the primary winding $L_p$, the switch element $Q_1$, the electrolytic capacitor $C_1$, and the winding $L_b$. Another series connection consists of the secondary winding $L_s$, the diode $D_2$, and the capacitor $C_3$. An output voltage $V_0$ is measured across the output terminals $X_3$ and $X_4$ by the control circuit 21 so as to generate a control signal for adjusting the conduction time of the switch element $Q_1$. As a result, the voltage $V_0$ is kept at a predetermined value.

Again referring to FIG. 9, $V_{s1}$ is the ac input; $V_{in}$ is an input voltage of the bridge rectifier $DB_1$ measured across the input terminals $X_1$, and $X_2$; $I_{in}$ is an input current thereof; $V_{in(rec)}$ is an output voltage of the bridge rectifier $DB_1$; $I_{La}$ and $I_{Lb}$ are currents of the first winding $L_a$ and the second winding $L_b$ respectively; $V_y$ is a voltage measured between the first winding $L_a$ and the diode $D_1$; and $V_{dc}$ is an input dc voltage of the electrolytic capacitor $C_1$.

In the above embodiment, the current $I_{Lb}$ having a slope $V_{dc}/(L_b+L_p)$ is generated on the secondary winding $L_p$ when the switch element $Q_1$ is conducting. Then, the current $I_b$ flows from the anode of the electrolytic capacitor $C_1$ through the windings $L_b$, $L_p$ and the switch element $Q_1$ to the cathode of the electrolytic capacitor $C_1$. Since the windings $L_b$, $L_p$ wind round the same core $T_{r1}$, the polarity between the windings $L_b$, $L_p$ will then let the diode $D_1$ be reverse biased and act as an open circuit to block the current $I_{La}$ of the winding $L_a$, i.e., the current $I_{La}$ is approximately zero. The magnetic lines in the core $T_{r1}$ will expand because the current $I_{Lb}$ is still flowing through the winding $L_b$.

The magnetic lines in the core $T_{r1}$ will diminish when the switch element $Q_1$ is cut off. As a result, the polarity is reversed. Then the diode $D_1$ is forward biased and acts as a closed circuit to conduct the current $I_{La}$ of the winding $L_a$ having a slope of $(V_{in(rec)}-V_{dc})/L_a$ which flows from the bridge rectifier $DB_1$ to the electrolytic capacitor $C_1$.

Figure 10:
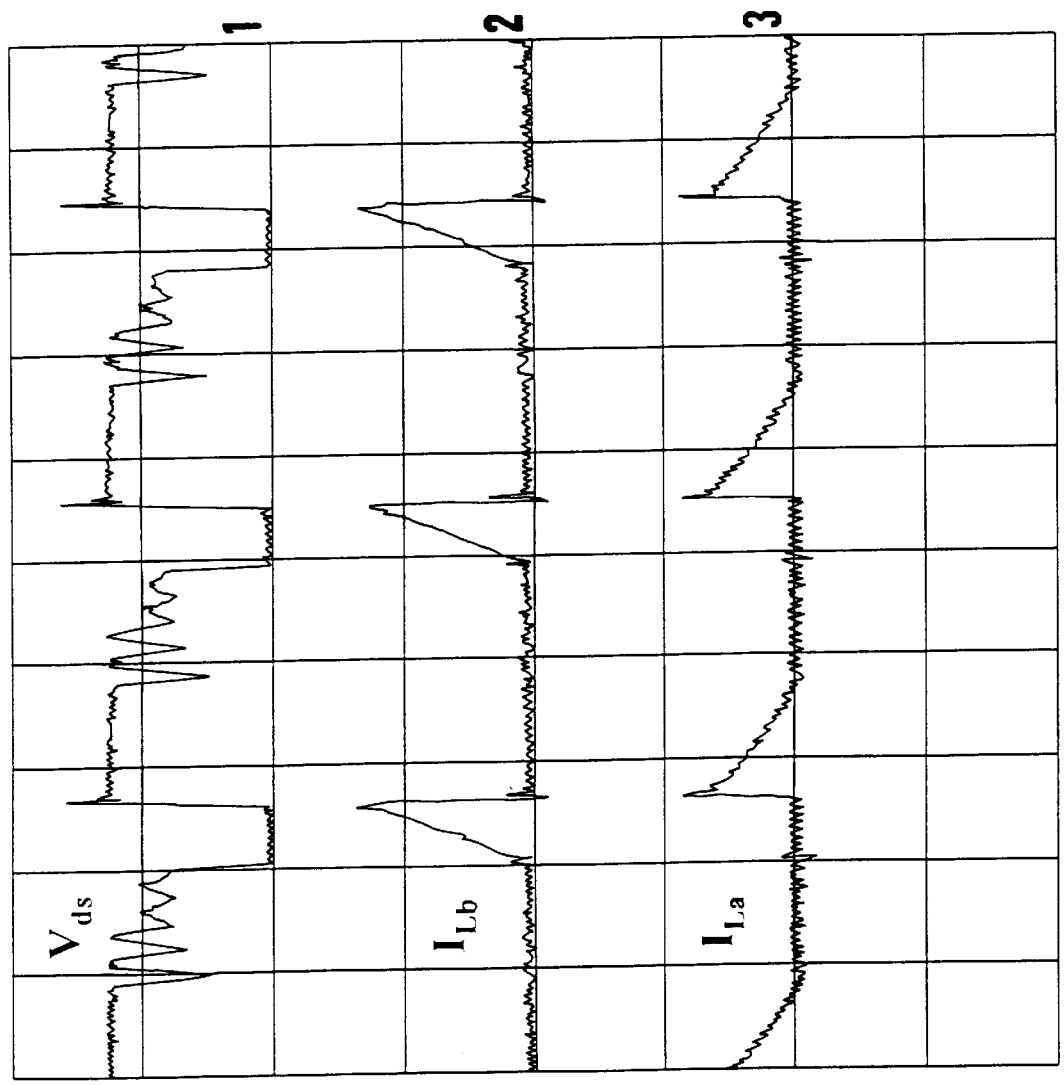
FIG. 10 is a graph showing the wave shapes of the voltage $V_{ds}$ of the switch element versus the current $I_{La}$, $I_{Lb}$ of windings La, Lb of FIG. 9.
Figure 11:
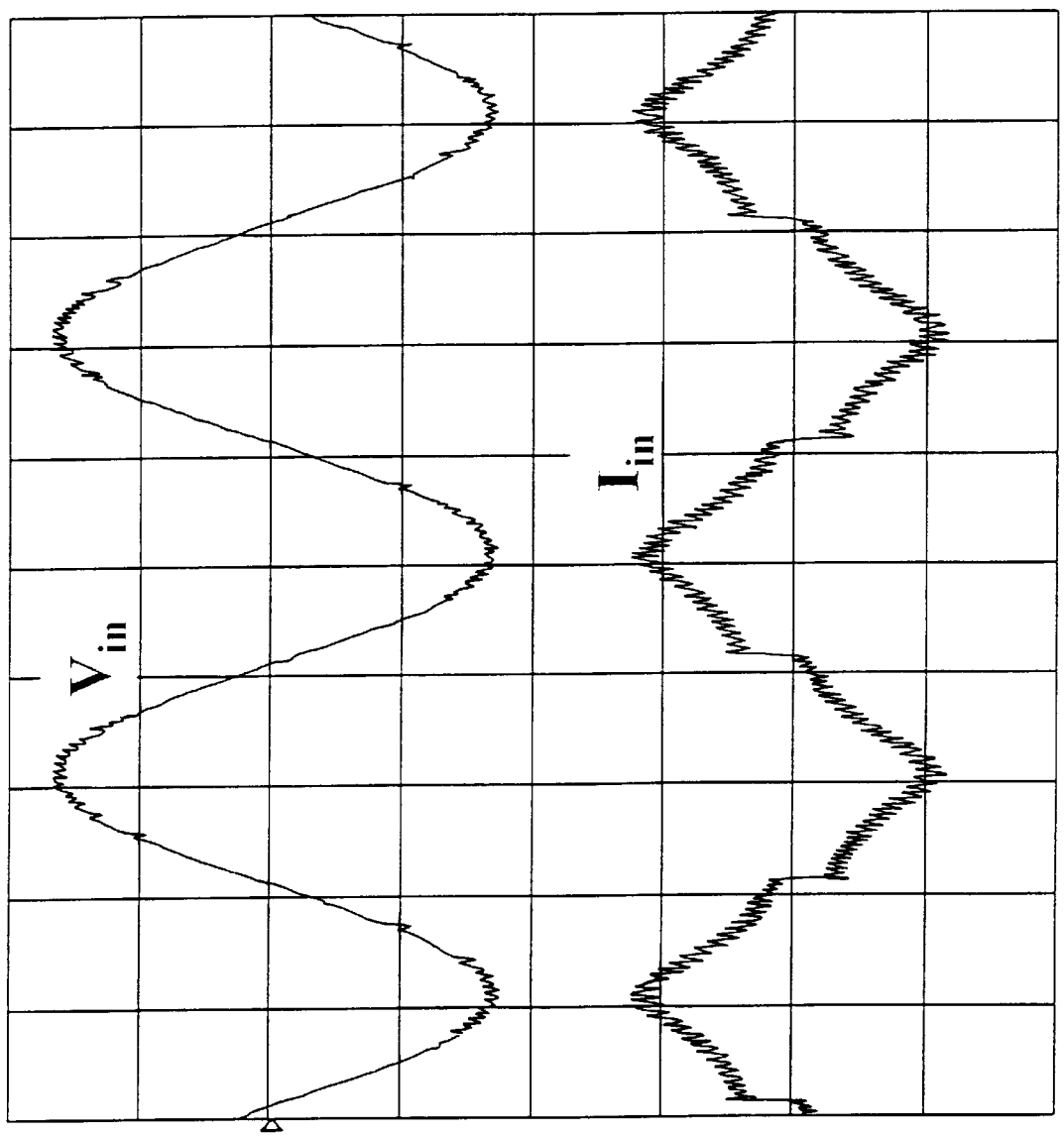
FIG. 11 is a graph showing the wave shapes of the input voltage $V_{in}$ versus the input current $I_{in}$ of FIG. 9.

In FIG. 10, a graph shows the wave shapes of the voltage $V_{ds}$ of the switch element $Q_1$ versus the current $I_{La}$ of the winding $L_a$ and the current $I_{Lb}$ of the winding $L_a$. In FIG. 11, a graph shows the wave shapes of the input voltage $V_{in}$ versus the input current $I_{in}$. In view of these two graphs, it is found that the input current $I_{in}$ generated in the present embodiment complies with the requirements of Class A or Class D stipulated in harmonic current rules IEC-1000-3-2. The above feature will be more apparent from table I and table II by comparing the experiment data of the harmonics of the input current $I_{in}$ of the embodiment shown in FIG.9 with the requirements of Class D stipulated in harmonic current rules IEC-1000-3-2.

In view of the above, the power factor correction circuit 10 according to the present invention will make sure that the input current $I_{in}$ always flows to the electrolytic capacitor $C_1$ during each sinusoidal period (i.e., the period of the switch element $Q_1$ switching from conduction to cutoff and vice versa) of an ac voltage $V_{in}$. The power factor is then increased to above 0.9 by appropriately adjusting the induction of the windings $L_a$, $L_b$ and the induction of the secondary winding $L_p$ of the transformer $T_{r2}$ of the DC/DC converter 2. Moreover, the THD is dropped to below 15%.

Figure 1:
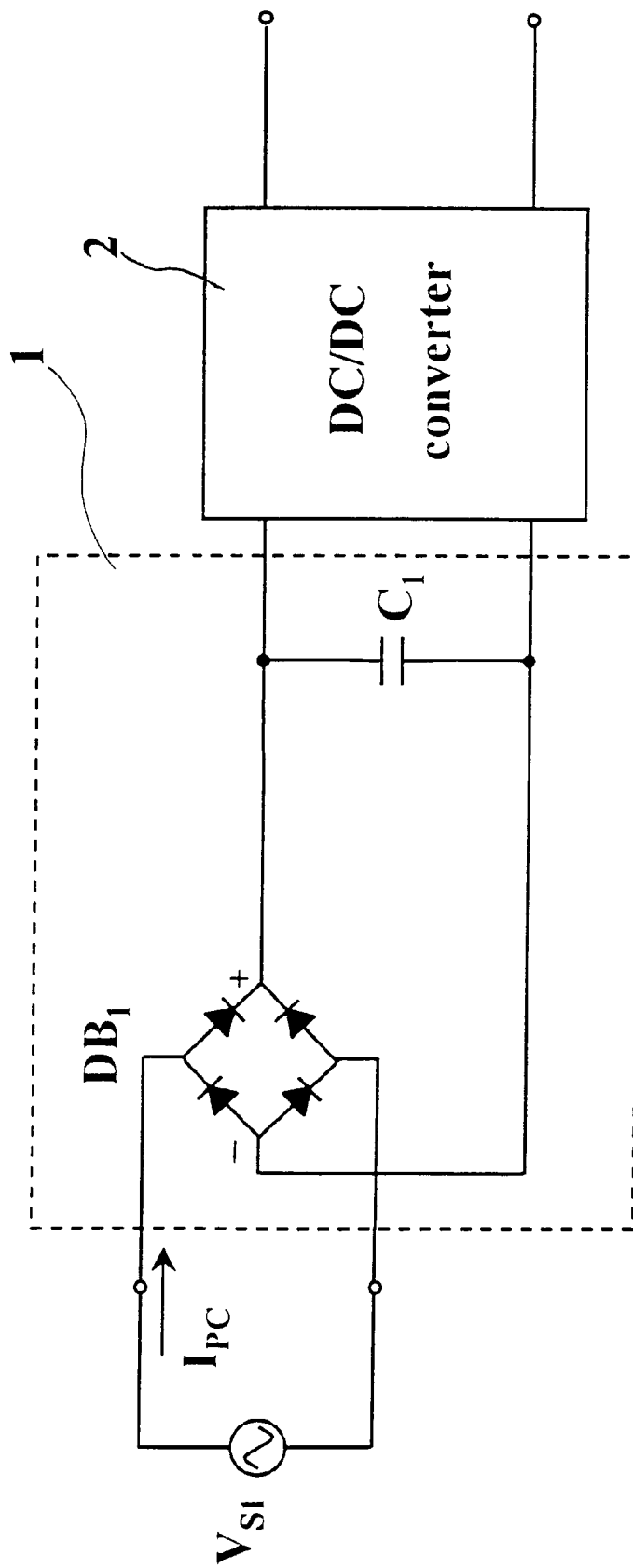
FIG. 1 is a circuit diagram of a prior art off-line switching power supply.
Figure 2:
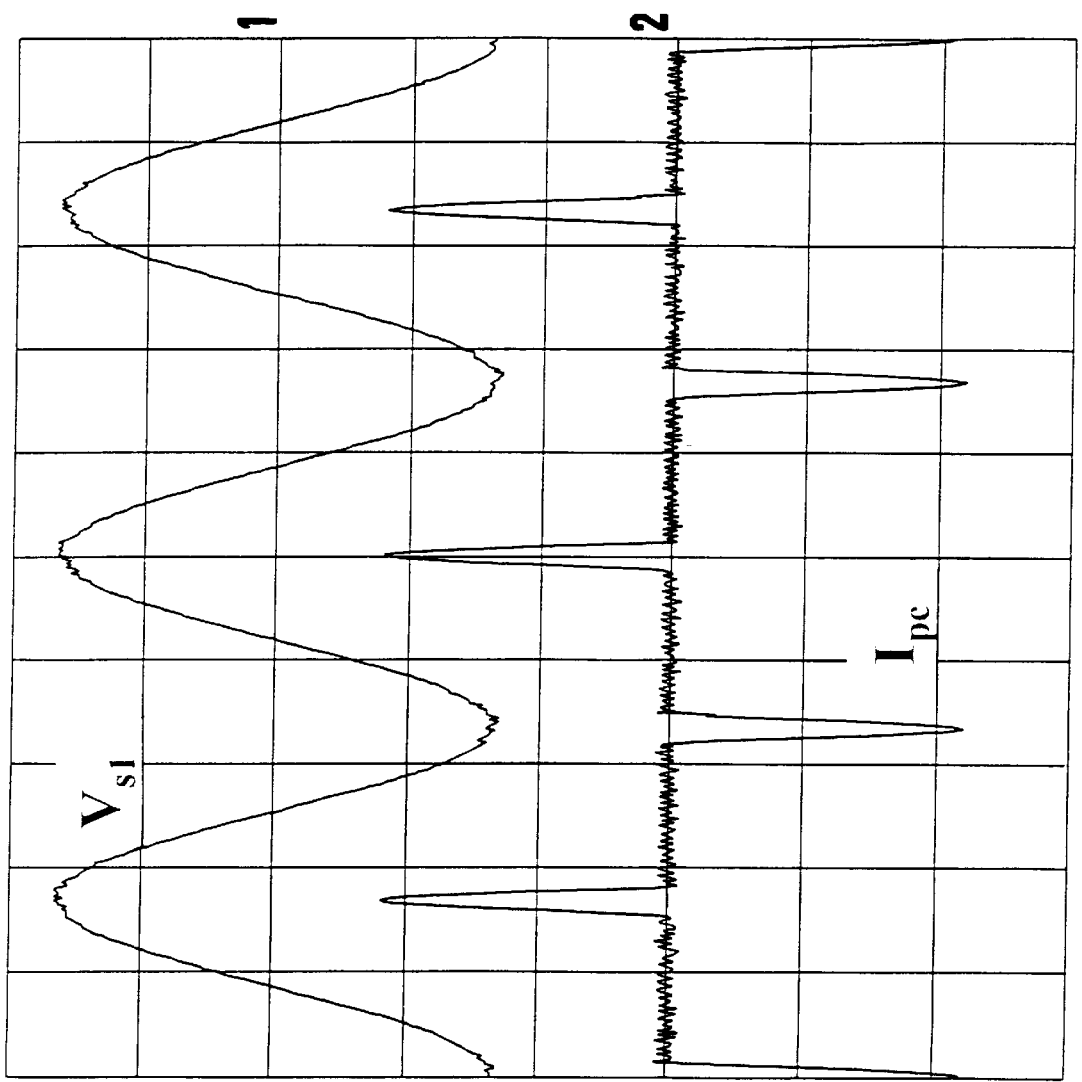
FIG. 2 is a graph showing the wave shapes of the input voltage versus the input current of FIG. 1.
Figure 3:
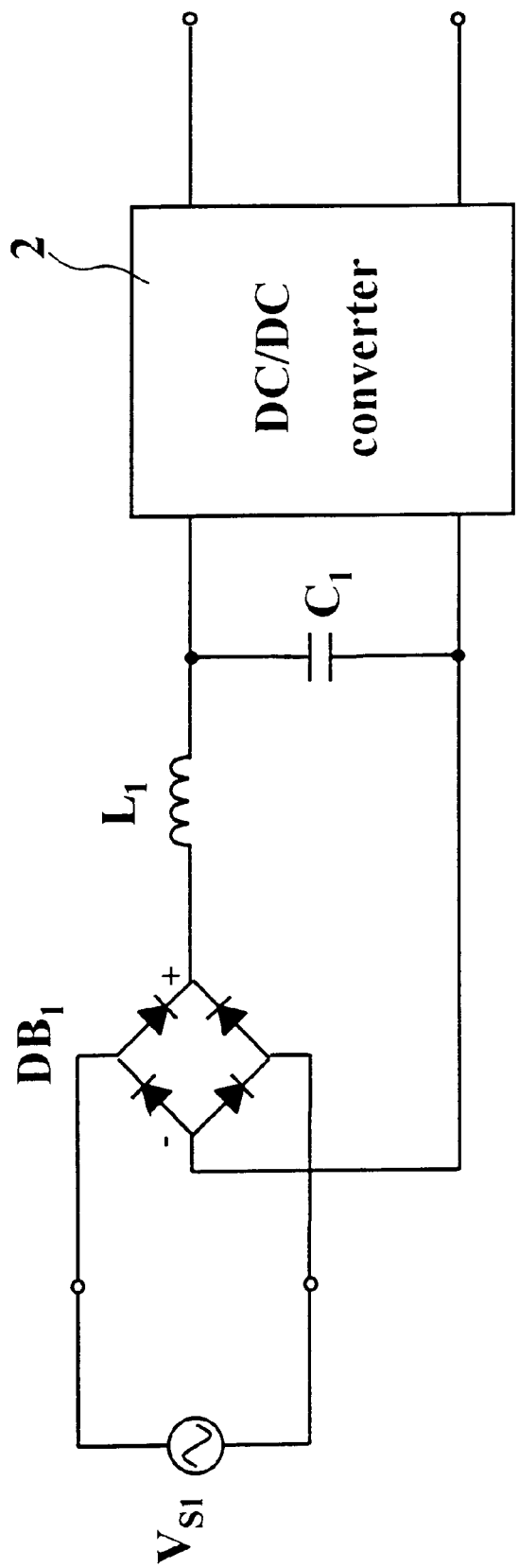
FIG. 3 is a circuit diagram of an inductor type power factor correction circuit.
Figure 4:
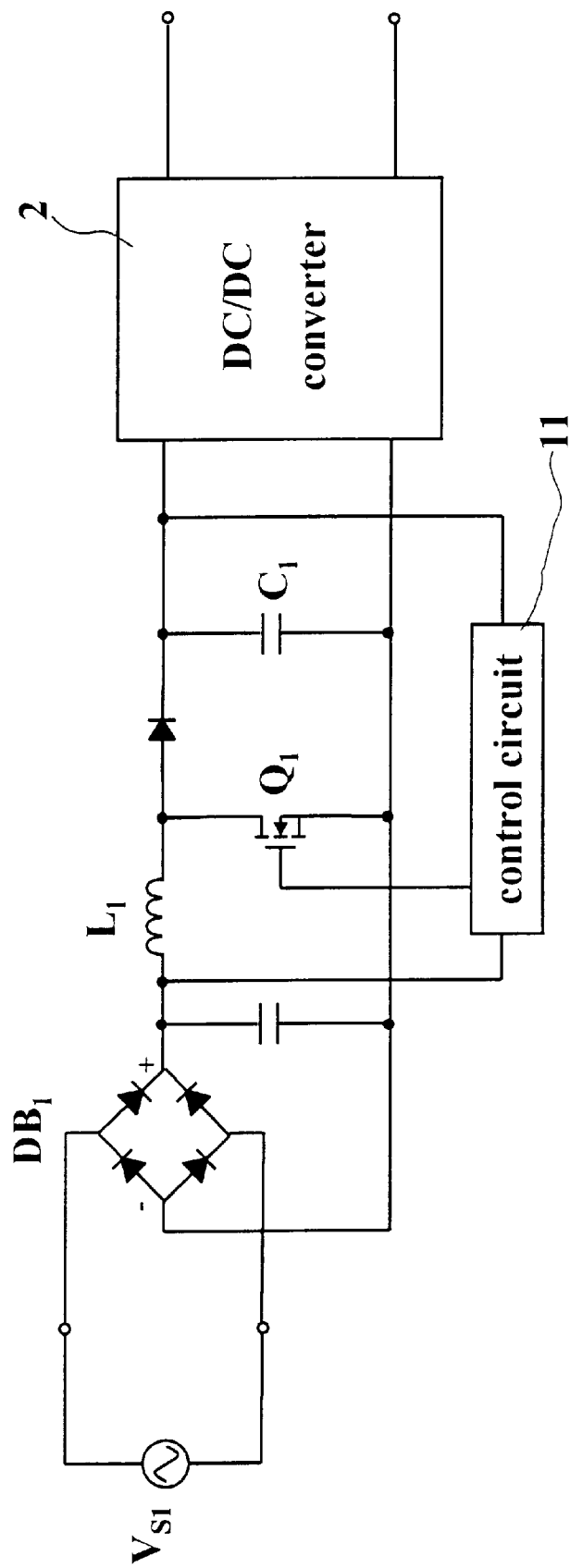
FIG. 4 is a circuit diagram of an active type power factor correction circuit.
Figure 5:
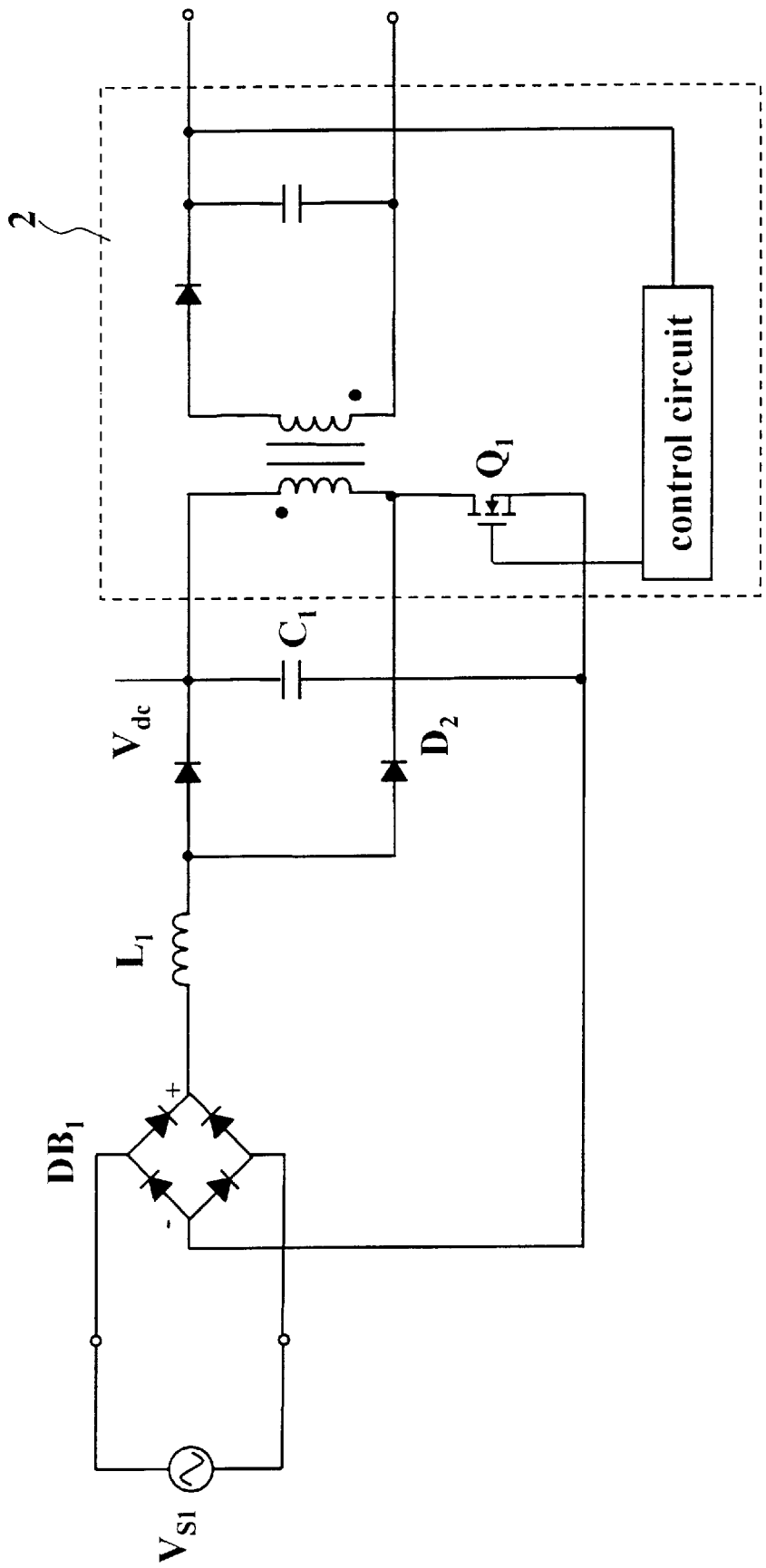
FIG. 5 is a circuit diagram of a dither type power factor correction circuit of single-stage single-switch.
Figure 6:
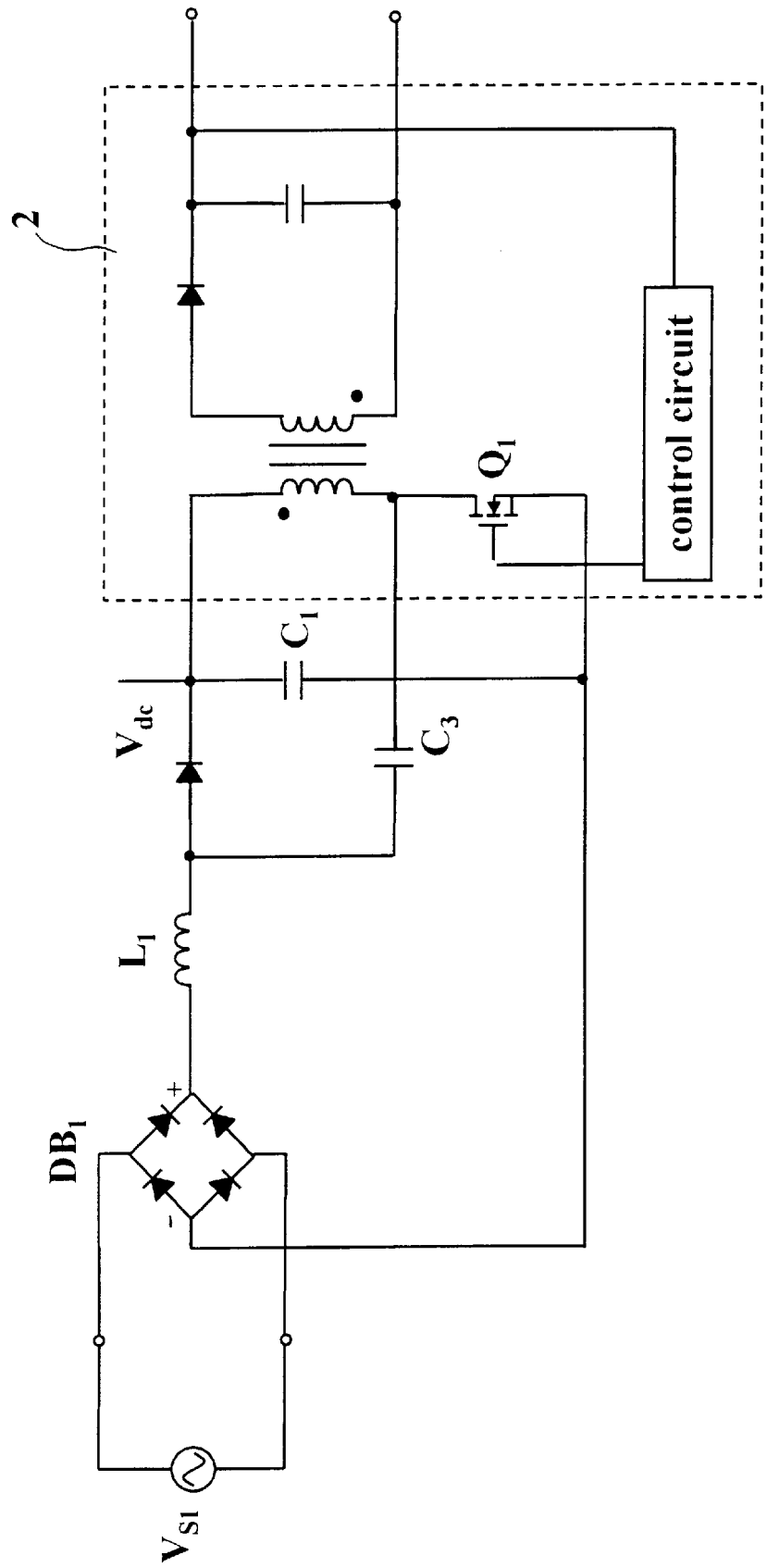
FIG. 6 is a circuit diagram of U.S. Pat. No. 5,301,095.
Figure 7:
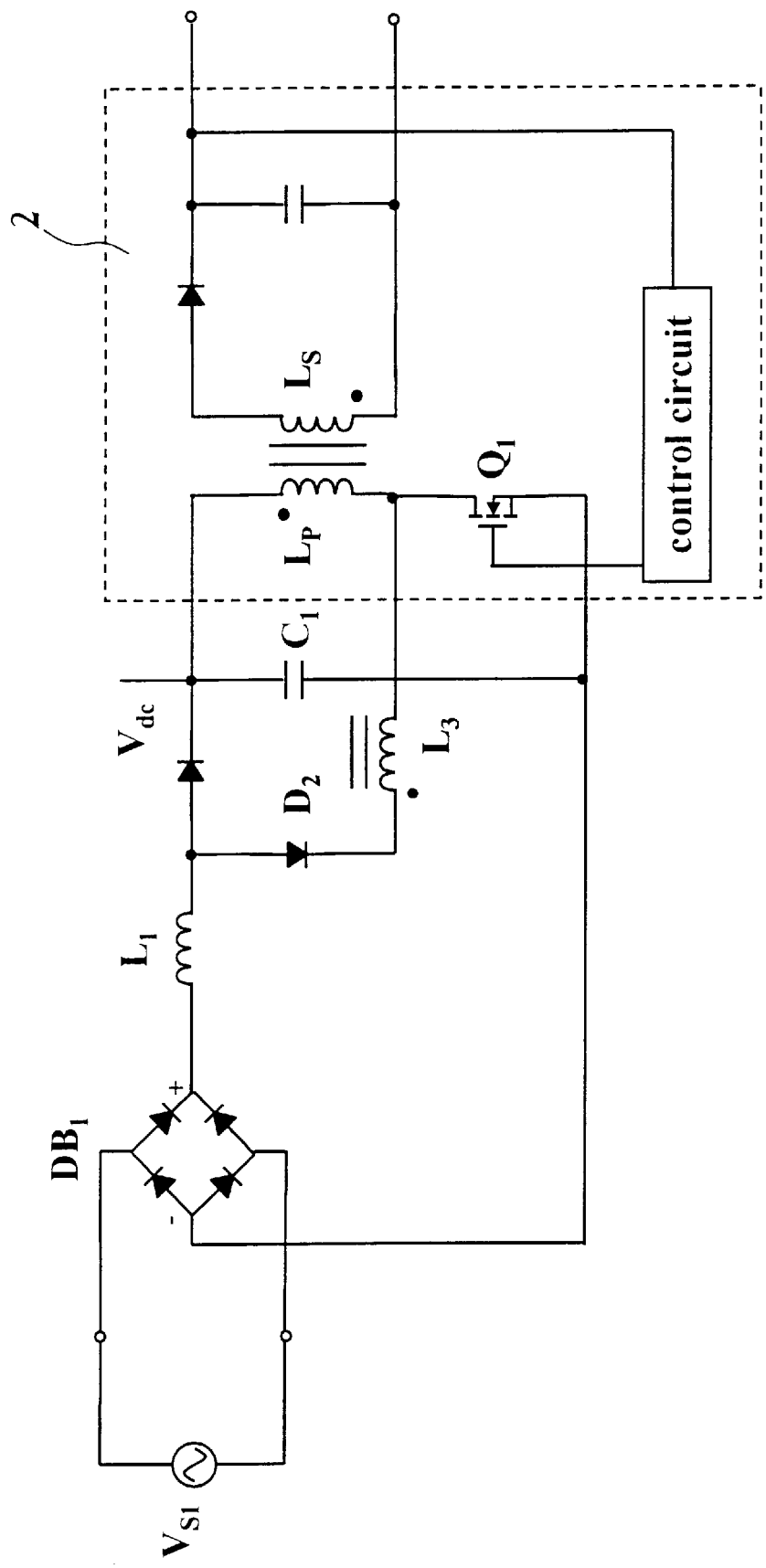
FIG. 7 is a circuit diagram of U.S. Pat. No. 5,600,546.
Figure 12:
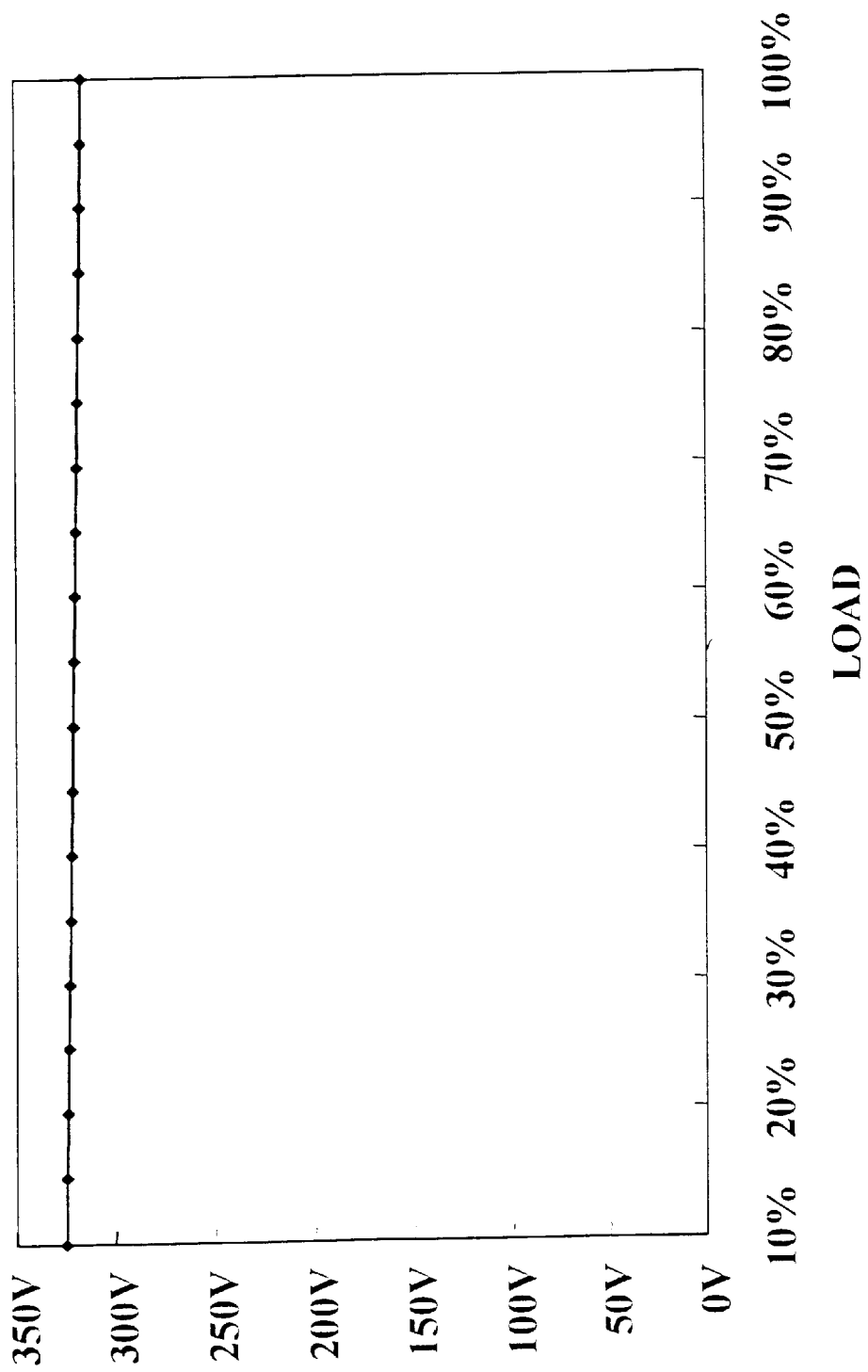
FIG. 12 is a graph showing the voltage $V_{dc}$ of the electrolytic capacitor $C_1$ of FIG. 9 versus varying load.
Figure 13:
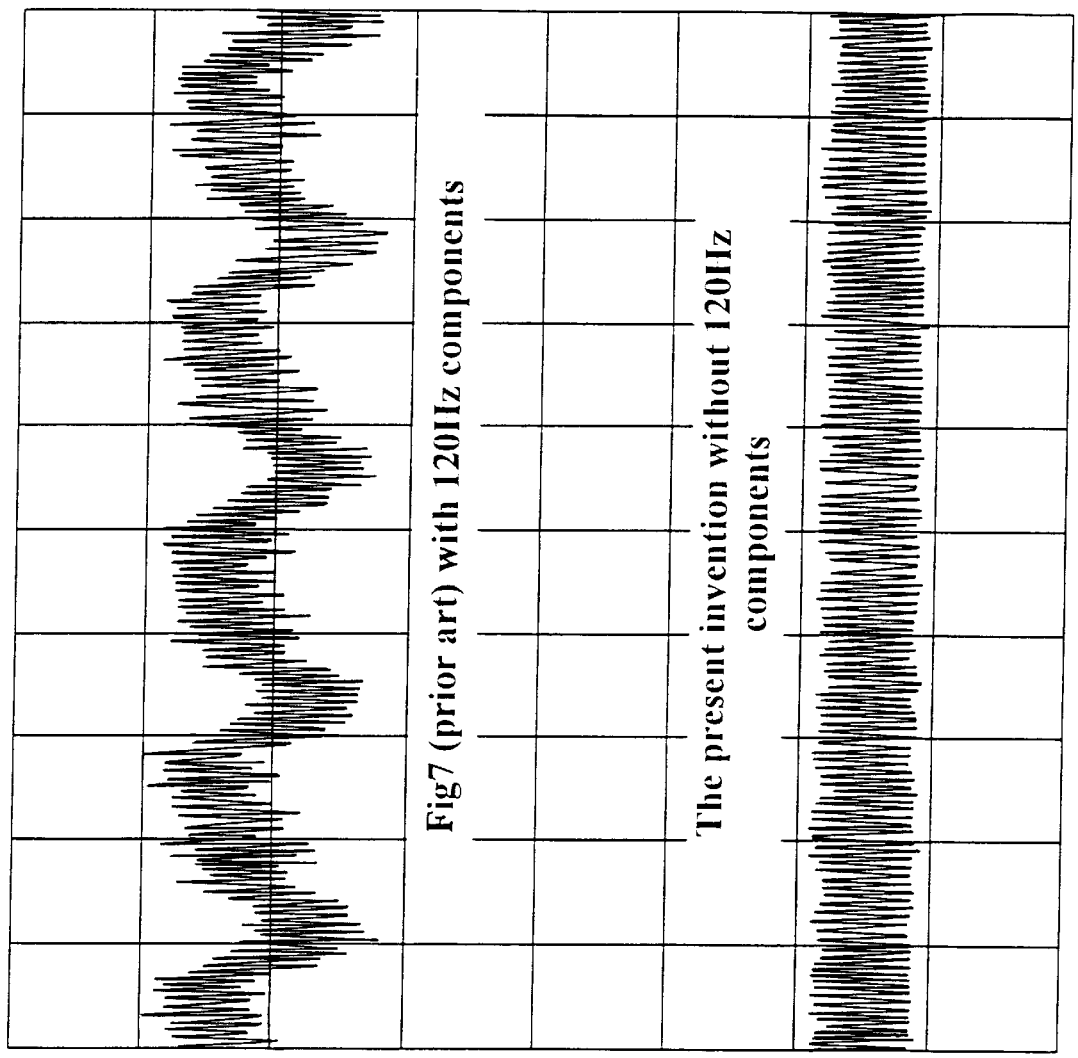
FIG. 13 is a graph showing the wave shapes of the ripple voltages in the secondary electrolytic capacitors of the present invention shown in FIG. 9 and the prior art shown in FIG. 7.
Figure 14:
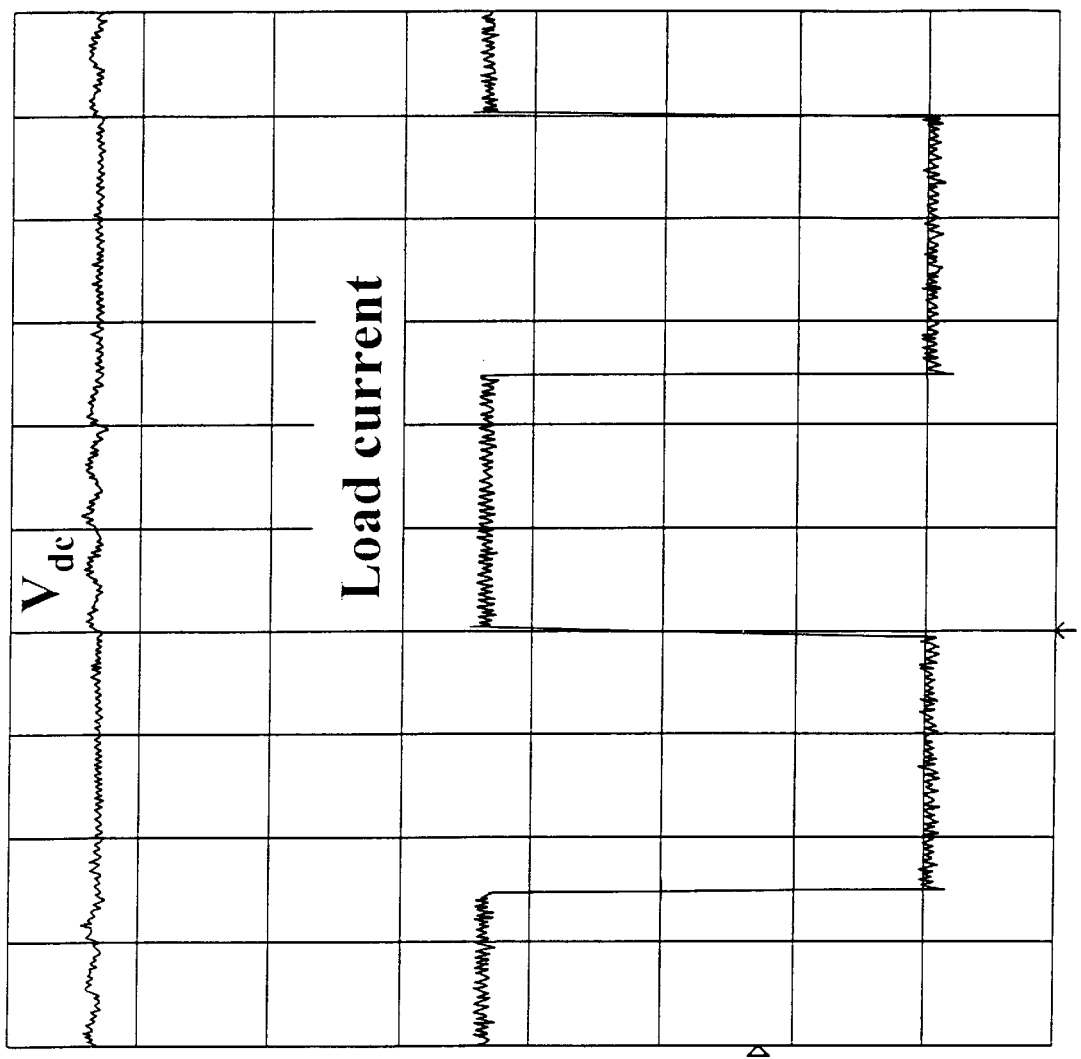
FIG. 14 is a graph showing the dc ripple voltage $V_{dc}$ of FIG. 9 versus varying load current.

As shown in FIG. 12, the voltage of the electrolytic capacitor $C_1$ is kept at a stable range when the load is varied. Further, as shown in FIG. 13, the ripple output voltage of the DC/DC converter 2 of the present embodiment is not affected by the 120 Hz ac voltage input, while that of the prior art power supply shown in FIG. 7 is adversely affected. Furthermore, as shown in FIG. 14, the dc ripple voltage $V_{dc}$ of the electrolytic capacitor $C_1$ will not rise if the load suddenly drops significantly when the DC/DC converter 2 is operating in the continuous current mode.

Figure 15:
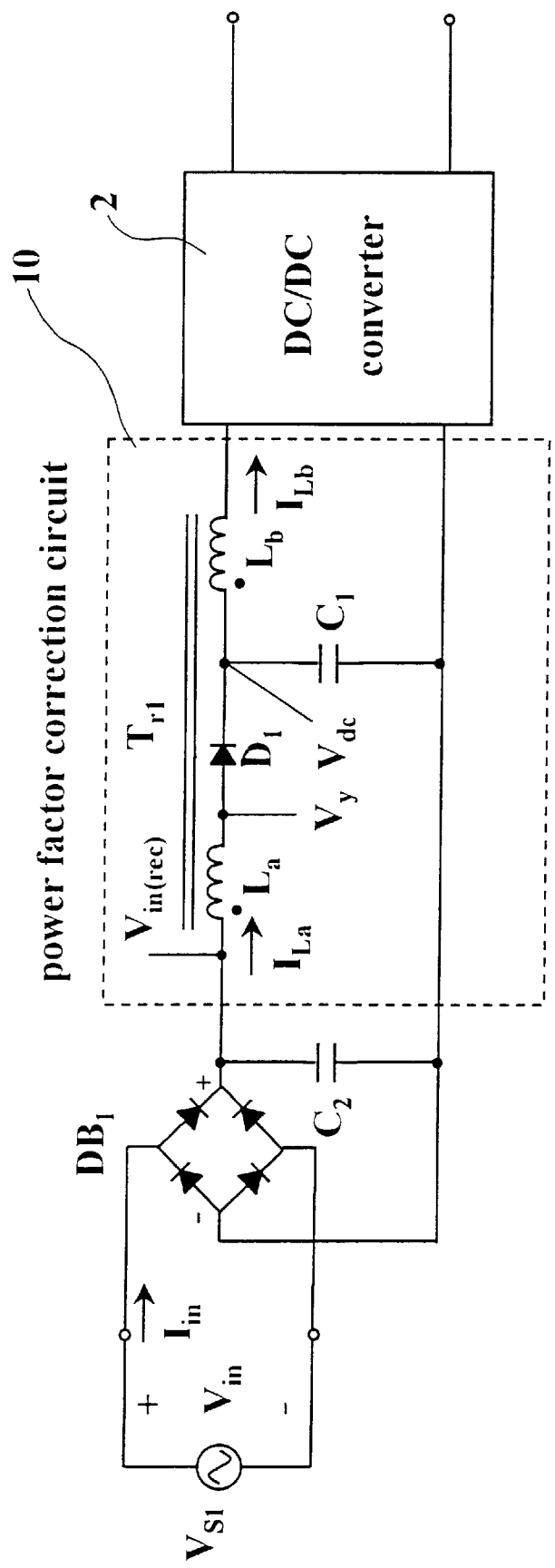
FIG. 15 is a circuit diagram of a second embodiment of the present invention.

FIG. 15 illustrates a second embodiment of the present invention in which a high frequency filter capacitor $C_2$ is added to be in a parallel connection with the power factor correction circuit 10 for filtering out the high frequency component of the circuit 10. As such, the output current of the bridge rectifier DB1 is smoothed by the action of the capacitor $C_2$.

Figure 16:
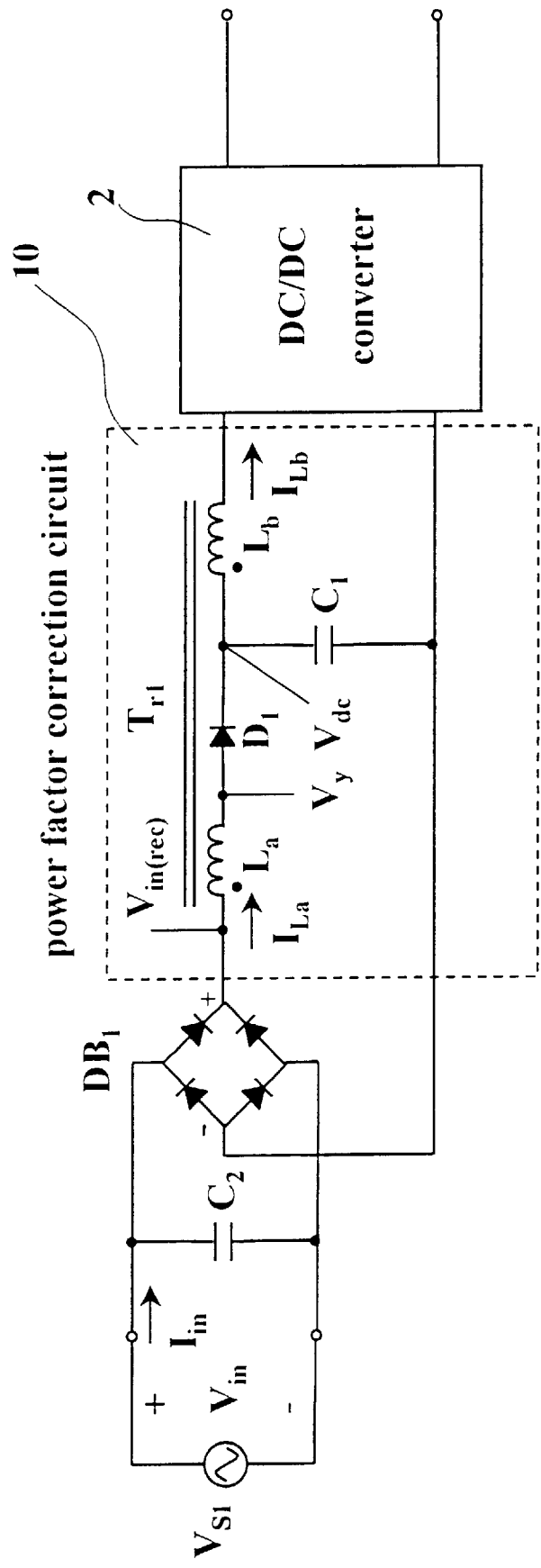
FIG. 16 is a circuit diagram of a third embodiment of the present invention.

FIG. 16 illustrates a third embodiment of the present invention in which a high frequency filter capacitor $C_2$ is added to be in a parallel connection with the bridge rectifier $DB_1$ for filtering out the high frequency component of the circuit 10. As such, the input current $I_{in}$ of the ac source $V_{s1}$ is smoothed by the action of the capacitor $C_2$.

Note that the fly-back converter as implemented in the above embodiments may be readily replaced by a forward converter, a half-bridge converter, a full-bridge bridge converter, all of which a push-pull converter, or a boost converter should also be deemed as falling within the scope of the present invention.

While the invention herein disclosed has been described by means of specific embodiments, numerous modifications and variations could be made thereto by those skilled in the art without departing from the scope of the invention set forth in the claims.

What is claimed is:

1. A power factor correction circuit comprising:
    a first series connection made up of a bridge rectifier, a first winding, a diode, and an electrolytic capacitor mutually connected in series;
    a second series connection made up of the electrolytic capacitor, a second winding, and a DC/DC converter mutually connected in series;
    a common core wound round by the first winding and the second winding;
    wherein the diode switches between a reverse bias and a forward bias by controlling polarities of the windings such that an input current of an alternating current voltage always flows to the electrolytic capacitor during each sinusoidal period of the alternating current voltage.

2. The power factor correction circuit of claim 1, wherein the DC/DC converter further comprising: a transformer in which a first series connection consists of a primary winding of the transformer, a switch element on a primary side of the transformer, the electrolytic capacitor on the primary side of the transformer, and the second winding, and a second series connection consists of a secondary winding of the transformer, a diode on a secondary side of the transformer, and a capacitor on the secondary side of the transformer; and a control circuit connected between the switch element and an output of the DC/DC converter for measuring an output voltage of the converter so as to generate a control signal for adjusting a conduction time of the switch element for keeping the output voltage at a predetermined value.

3. The power factor correction circuit of claim 1 or 2, wherein a first high frequency filter capacitor is connected in parallel with the power factor correction circuit for filtering out a high frequency component of the power factor correction circuit for smoothing an output current of the bridge rectifier.

4. The power factor correction circuit of claim 1 or 2, wherein a second high frequency filter capacitor is connected in parallel with the bridge rectifier for filtering out a high frequency component of the power factor correction circuit for smoothing the input current of the alternating current voltage.

* * * * *